United States Patent
Tong et al.

(10) Patent No.: US 8,513,931 B2
(45) Date of Patent: Aug. 20, 2013

(54) SNUBBER CIRCUIT FOR BUCK CONVERTER

(75) Inventors: Song-Lin Tong, Shenzhen (CN); Qi-Yan Luo, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 405 days.

(21) Appl. No.: 13/031,621

(22) Filed: Feb. 22, 2011

(65) Prior Publication Data

US 2012/0112715 A1    May 10, 2012

(30) Foreign Application Priority Data

Nov. 8, 2010  (CN) .......................... 2010 1 0534913

(51) Int. Cl.
*G05F 1/00* (2006.01)
(52) U.S. Cl.
USPC .......................................... 323/282; 323/271

(58) Field of Classification Search
USPC .................................................. 323/271, 282
See application file for complete search history.

(56) References Cited

U.S. PATENT DOCUMENTS 4,947,311 A * 8/1990 Peterson ........................ 323/282
8,461,818 B1 * 6/2013 Benes ............................ 323/282

* cited by examiner

*Primary Examiner* — Jue Zhang
(74) *Attorney, Agent, or Firm* — Altis Law Group, Inc.

(57) ABSTRACT

A snubber circuit for decreasing a voltage spike of a buck converter includes a resistor unit, a capacitor unit, a detecting unit, and a control unit. The resistor unit provides multiple groups of resistance values. The capacitor unit provides multiple groups of capacitance values. The detecting unit detects voltage spikes of the buck converter corresponding to each group of resistance values and capacitance values. The control unit selects each group of resistance and capacitance to respectively connect to the buck converter and determines a group of resistance and capacitance corresponding to a lowest voltage spike by comparing the detected voltage spikes with each other.

18 Claims, 2 Drawing Sheets

SNUBBER CIRCUIT FOR BUCK CONVERTER

BACKGROUND

1. Technical Field

The disclosure generally relates to snubber circuits for buck converters, and particularly to a snubber circuit for decreasing a voltage spike of a buck converter.

2. Description of Related Art

Buck converters are widely incorporated in power supplies of many electronic devices, due to their fast response, and simple structure. However, while switches such as transistors, and diodes of the buck converters turn on and turn off at a high frequency, a voltage spike can generate and may damage the switches.

A commonly used RC snubber circuit includes a resistor and a capacitor connected in series, and is applied to the buck converter to decrease the voltage spike. To reduce the voltage spike as much as possible, multiple resistors and capacitors need to be used in the buck converter manually to determine a resistance and capacitance suitable for the buck converter, which is inconvenient and time consuming.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
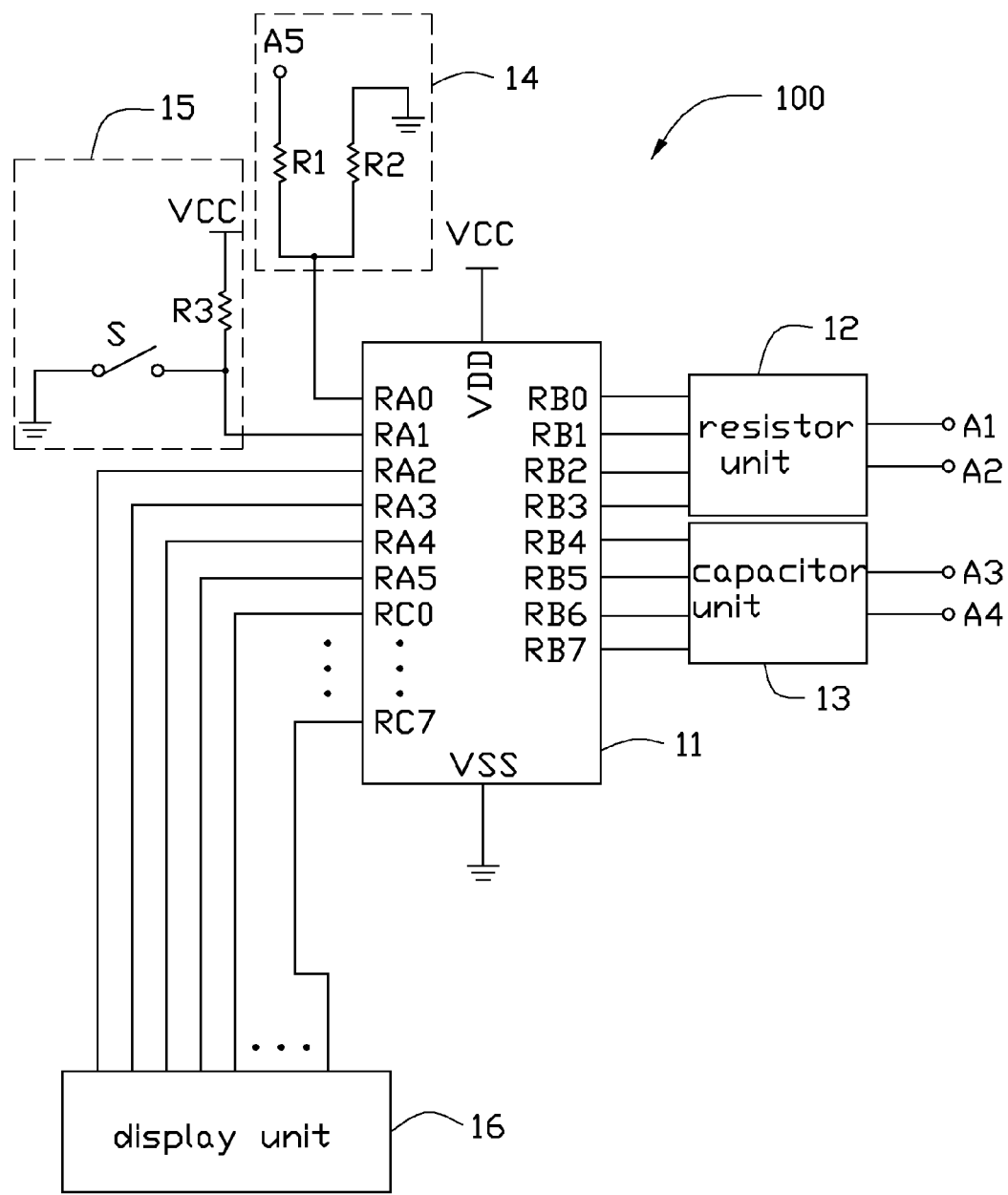
FIG. 1 shows a snubber circuit, according to an exemplary embodiment.
Figure 2:
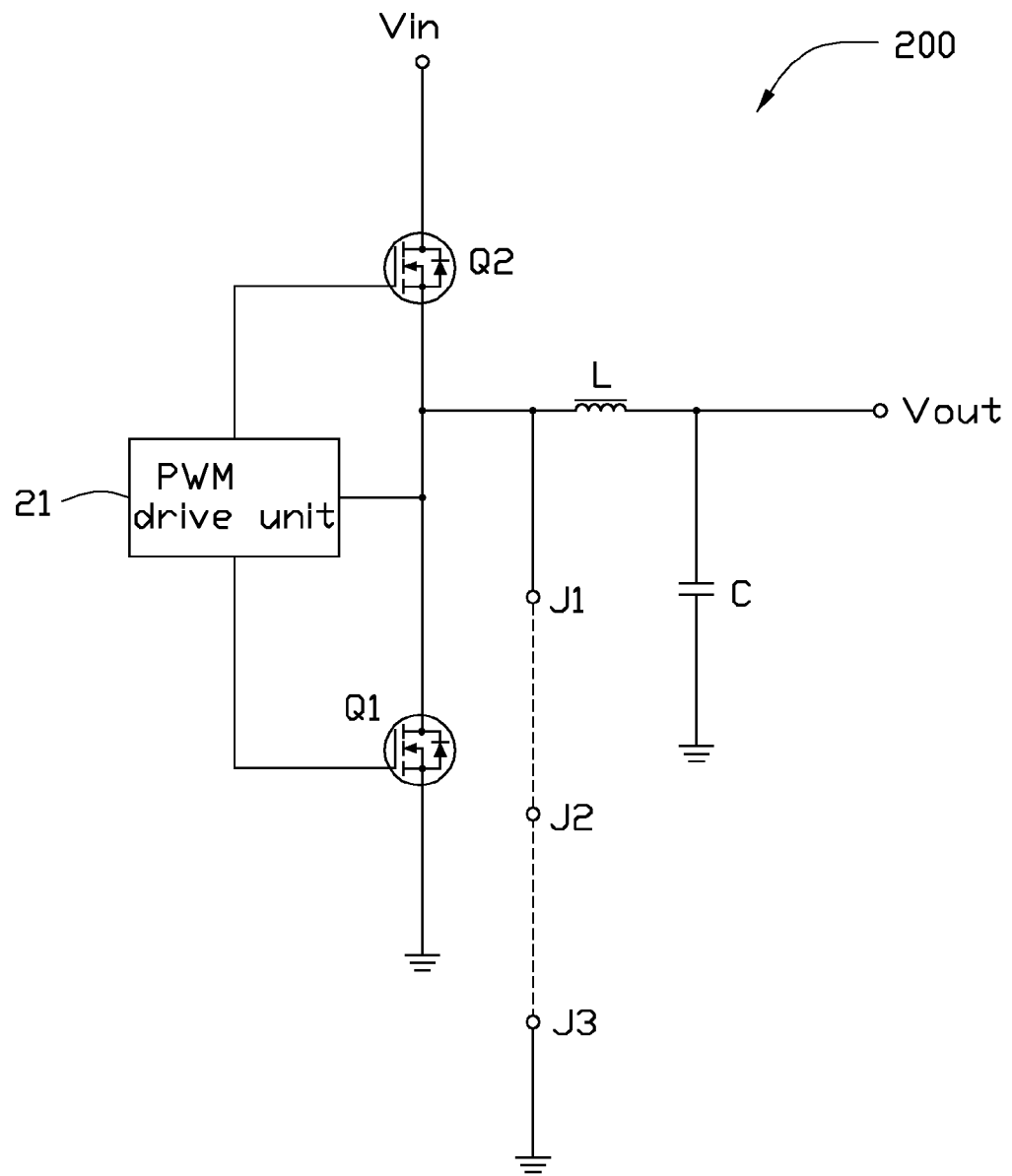
FIG. 2 shows a buck converter comprising the snubber circuit of FIG. 1.

Referring to FIGS. 1 and 2, a snubber circuit 100 for a buck converter 200, according to an exemplary embodiment, includes a control unit 11, a resistor unit 12, a capacitor unit 13, a detecting circuit 14, a start circuit 15, and a display unit 16. The resistor unit 12, the capacitor unit 13, the detecting circuit 14, the start circuit 15, and the display unit 16 are electronically connected to the control unit 11.

The control unit 11 includes a power contact VDD, a ground contact VSS, a group of first switch contacts RB0-RB3, a group of second switch contacts RB4 and RB7, a detecting contact RA0, a start contact RA1, a group of display control contacts RA2-RA5, and a group of data transmitting contacts RC0-RC7. The power contact VDD is connected to a power supply VCC. The ground contact VSS is grounded. The group of first switch contacts RB0-RB3 are connected to the resistor unit 12. The group of second switch contacts RB4-RB7 are connected to the capacitor unit 13. The detecting contact RA0 is connected to the detecting circuit 14. The start contact RA0 is connected to the switch circuit 15. The group of display control contacts RA2-RA5 and the group of data transmitting contacts are connected to the display unit 16.

The resistor unit 12 may be a resistance box. The resistor unit 12 includes two first terminals A1 and A2. Resistance value (i.e., resistance) between the two first terminals A1 and A2 can be adjusted when the control unit 11 changes states of the group of the first switch contacts RB0-RB3. For example, when the states of the group of first switch contacts AB0-AB3 is low, low, low, low (i.e., 0000), the resistance of the resistor unit 12 is 0.51 ohm. When the states of the group of first switch contacts AB0-AB3 is low, low, low, high (i.e., 0001), the resistance of the resistor unit 12 is 1 ohm. The resistor unit 12 can be connected to the buck converter 200 by the two first terminals A1 and A2 and provides multiple resistance values for the buck converter 200.

The capacitor unit 13 may be a capacitor box. The capacitor unit 13 includes two second terminals A3 and A4. Substantially similar to the resistor unit 12, capacitance value (i.e., capacitance) of the two second terminal A3 and A4 can be adjusted when the control unit 11 changes states of the group of the second switch contacts RB4-RB7. The capacitor unit 13 can be connected to the buck converter 200 by the second terminal A3 and A4 and provides multiple capacitance values for the buck converter 200.

The detecting circuit 14 includes a first resistor R1 and a second resistor R2 connected in series. One end of the first resistor R1 and second resistor R2 is grounded. Another end of the first resistor R1 and second resistor R2 is served as a detecting terminal A5. The detect circuit 14 can be connected to the buck converter 200 by the detecting terminal A5 and detects voltage spikes of the buck converter 200.

The start circuit 15 includes a third resistor R3 and a switch S. The third resistor R3 is connected between the power supply VCC and the start contact RA0. The switch S is connected between the start contact RA0 and ground. When the switch S is turned on, the control unit 11 is started. When the switch S is turned off, the control unit 11 is shut down.

The display unit 16 is configured for displaying the resistances of the resistor unit 12, the capacitances of the capacitor unit 13, and the voltage spikes detected by the detecting unit 14.

Referring to FIG. 2, a buck converter 200 includes a pulse width modulation (PWM) drive unit 21, a first switch Q1, a second switch Q2, an inductor L, a capacitor C, and three input terminals J1-J3.

In this embodiment, the first and second switches Q1, Q2 are metal-oxide semiconductor field effect transistor (MOSFETs). The PWM drive unit 21 is connected to the gates of the first and second switches Q1, Q2, a drain of the first switch Q1, and a source of the second switch Q2. The drain of the first switch Q1 is connected to the source of the switch Q2. A source of the first switch Q1 is grounded. A drain of the second switch Q2 is connected to a power supply Vin. The inductor L and capacitor C are connected in series between the drain of the first switch Q1 and ground. The three input terminals J1-J3 are linearly arranged between the drain of the first switch Q1 and ground.

To decrease the voltage spikes of the buck converter 200, the detecting terminal A5 is connected to the input terminal J1 (i.e. the drain of the first switch). The first terminals A1 and A2 are respectively connected to the input terminals J1 and J2. The second terminals A3 and A4 are respectively connected to the terminals J2 and J3. The switch S is turned on to start the control unit 11. The control unit 11 adjusts resistance value of the resister unit 12 by changing states of the group of first switch contacts AB0-AB3 and adjusts capacitance value of the capacitor unit 13 by changing states of the group of first switch contacts AB4-AB7. Therefore, multiple groups of resistance and capacitance can be selected and provided to the buck converter 200. The detecting contact RA0 detects voltage spikes of the buck converter 200 corresponding to each group of resistance and capacitance. Therefore, a suitable group of resistance and capacitance corresponding to a lowest voltage spike can be determined by the control unit 11 by comparing the detected voltage spikes.

The snubber circuit 100 can automatically determine a suitable group of resistance and capacitance for the buck converter 200 to decrease the voltage spike, which is convenient and effective.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A snubber circuit for a buck converter, the snubber circuit comprising:
    a resistor unit that provides multiple groups of resistance values;
    a capacitor unit that provides multiple groups of capacitance values;
    a detecting unit that detects voltage spikes of the buck converter corresponding to each group of resistance values and capacitance values;
    a control unit that selects each group of resistance values and capacitance values to respectively connect to the buck converter and determines a group of resistance values and capacitance values corresponding to a lowest voltage spike by comparing the detected voltage spikes with each other.

2. The snubber circuit as claimed in claim 1, wherein the control unit includes a group of first switch contacts connected to the resistor unit, a group of second switch contacts connected to the capacitor unit, a detecting contact connected to the detecting unit, the control unit changes states of the group of first switch contacts and the group of second switch contacts to select each group of resistance values and capacitance values, and obtains the detected voltage spike from the detecting unit.

3. The snubber circuit as claimed in claim 2, wherein the detecting circuit includes a first and second resistors connected in series, one end of the first and second resistors is grounded, another end of the first and second resistors is connected to the buck converter to detect the voltage spikes, a node between the first and second resistors is connected to the detecting contact.

4. The snubber circuit as claimed in claim 2, further including a start unit connected to the control unit to start the control unit.

5. The snubber circuit as claimed in claim 4, wherein the control unit further includes a start contact, the start unit includes a third resistor and a switch, the third resistor is connected between a power supply and the start contact, the switch is connected between the start contact and ground.

6. The snubber circuit as claimed in claim 2, further including a display unit connected to the control unit to display the resistances of the resistor unit, the capacitances of the capacitor unit, and the detected voltage spikes.

7. The snubber circuit as claimed in claim 6, wherein the control unit further includes a group of display control contacts and a group of data transmitting contacts connected to the display unit.

8. The snubber circuit as claimed in claim 1, wherein the resistor unit is a resistance box.

9. The snubber circuit as claimed in claim 1, wherein the capacitor unit is a capacitance box.

10. A buck converter, comprising:
    a first switch;
    a second switch, the first and second switches connected in series, one end of the first and second switches connected a power supply, another end of the first and second switches grounded;
    a pulse width modulation (PWM) drive unit connected to the first and second switches;
    an inductor;
    a capacitor, the inductor and the capacitor connected in series, one end of the inductor and the capacitor connected to a node between the first and second switches, another end of the inductor and the capacitor connected to ground; and
    a snubber circuit, comprising:
        a resistor unit that provides multiple groups of resistance values;
        a capacitor unit that provides multiple groups of capacitance values, the resistor unit and the capacitor unit connected in series, one end of the resistor unit and the capacitor unit connected the node between the first and second switches; and other end of the resistor unit and the capacitor unit grounded and providing multiple groups of resistance values and capacitance values;
        a detecting unit detecting voltage spikes of the buck converter corresponding to each group of resistance and capacitance;
        a control unit selecting each group of resistance values and capacitance values to respectively connect to the buck converter and determining a group of resistance values and capacitance values corresponding to a lowest voltage spike by comparing the detected voltage spikes with each other.

11. The buck converter as claimed in claim 10, wherein the control unit includes a group of first switch contacts connected to the resistor unit, a group of second switch contacts connected to the capacitor unit, a detecting contact connected to the detecting unit, the control unit changes states of the group of first switch contacts and the group of second switch contacts to select each group of resistance values and capacitance values, and obtains the detected voltage spikes from the detecting unit by the detecting contact.

12. The buck converter as claimed in claim 11, wherein the detecting circuit includes a first and second resistors connected in series, one end of the first and second resistors is grounded, another end of the first and second resistors is connected to the buck converter to detect the voltage spikes, a node between the first and second resistors is connected to the detecting contact.

13. The buck converter as claimed in claim 11, further including a start unit connected to the control unit to start the control unit.

14. The buck converter as claimed in claim 13, wherein the control unit further includes a start contact, the start unit includes a third resistor and a switch, the third resistor is connected between a power supply and the start contact, the switch is connected to between the start contact and ground.

15. The buck converter as claimed in claim 11, further including a display unit connected to the control unit to display the resistances of the resistor unit, the capacitances of the capacitor unit, and the detected voltage spikes.

16. The buck converter as claimed in claim 15, wherein the control unit further includes a group of display control contacts and a group of data transmitting contacts connected to the display unit.

17. The buck converter as claimed in claim 10, wherein the resistor unit is a resistance box.

18. The buck converter as claimed in claim 10, wherein the capacitor unit is a capacitance box.

* * * * *